United States Patent
Smith et al.

(10) Patent No.: US 7,328,915 B2
(45) Date of Patent: Feb. 12, 2008

(54) AIRBAG CUSHION WITH TETHER DEACTIVATED VENTING FOR REDUCED OUT-OF-POSITION EFFECTS

(75) Inventors: Bradley W. Smith, Ogden, UT (US); Michael P. Jordan, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 235 days.

(21) Appl. No.: 10/959,387

(22) Filed: Oct. 6, 2004

(65) Prior Publication Data
US 2006/0071462 A1 Apr. 6, 2006

(51) Int. Cl.
*B60R 21/16* (2006.01)

(52) U.S. Cl. .................... 280/739; 280/743.2
(58) Field of Classification Search ........... 280/739, 280/743.2
See application file for complete search history.

(56) References Cited

U.S. PATENT DOCUMENTS

| | | | | |
|---|---|---|---|---|
| 5,280,953 | A | | 1/1994 | Wolanin et al. ........... 280/739 |
| 5,350,188 | A | | 9/1994 | Sato |
| 5,405,166 | A | | 4/1995 | Rogerson ................. 280/739 |
| 5,492,363 | A | | 2/1996 | Haartmeyer et al. |
| 6,056,318 | A | * | 5/2000 | Braunschadel ........... 280/739 |
| 6,095,557 | A | | 8/2000 | Takimoto et al. ......... 280/739 |
| 6,139,048 | A | | 10/2000 | Braunschädel ......... 280/728.1 |
| 6,648,371 | B2 | * | 11/2003 | Vendely et al. .......... 280/739 |
| 6,773,027 | B2 | * | 8/2004 | Bohn et al. ............. 280/729 |
| 6,863,304 | B2 | * | 3/2005 | Reiter et al. ............ 280/739 |
| 7,083,191 | B2 | * | 8/2006 | Fischer ................. 280/739 |
| 2003/0209895 | A1 | * | 11/2003 | Gu ..................... 280/739 |
| 2004/0012179 | A1 | * | 1/2004 | Pinsenschaum et al. .... 280/739 |
| 2004/0056459 | A1 | | 3/2004 | Kassman et al. ......... 280/739 |
| 2004/0090054 | A1 | * | 5/2004 | Bossecker et al. ........ 280/739 |
| 2004/0130135 | A1 | * | 7/2004 | Ekdahl ................. 280/739 |

FOREIGN PATENT DOCUMENTS

| | | |
|---|---|---|
| DE | 196 40 322 A1 | 3/1996 |
| JP | 05085295 | 4/1993 ......... 280/736 |

OTHER PUBLICATIONS

Search Report and Written Opinion concerning the Corresponding International Application No. PCT/US05/27255.

* cited by examiner

*Primary Examiner*—Ruth Ilan
(74) *Attorney, Agent, or Firm*—Sally J Brown; Stoel Rives LLP

(57) ABSTRACT

An airbag cushion is disclosed for use in automotive protective systems. The airbag cushion includes a vent that, prior to cushion deployment, extends from the cushion exterior. A tether is coupled to the vent and to an interior surface of the cushion. Upon airbag deployment, the tether extends until taut or extends until the cushion encounters an obstruction. If pulled taut, the tether pulls the vent into the cushion interior where the interior air pressure effectively closes the vent. If the cushion encounters an obstruction, the tether remains lax, and the vent remains on the cushion exterior. Structures are provided for retaining the vent in the closed position during occupant ride down.

12 Claims, 6 Drawing Sheets

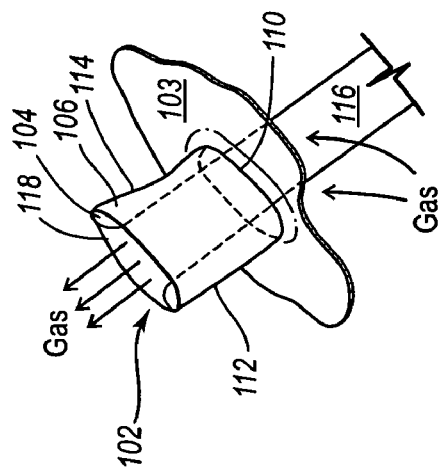
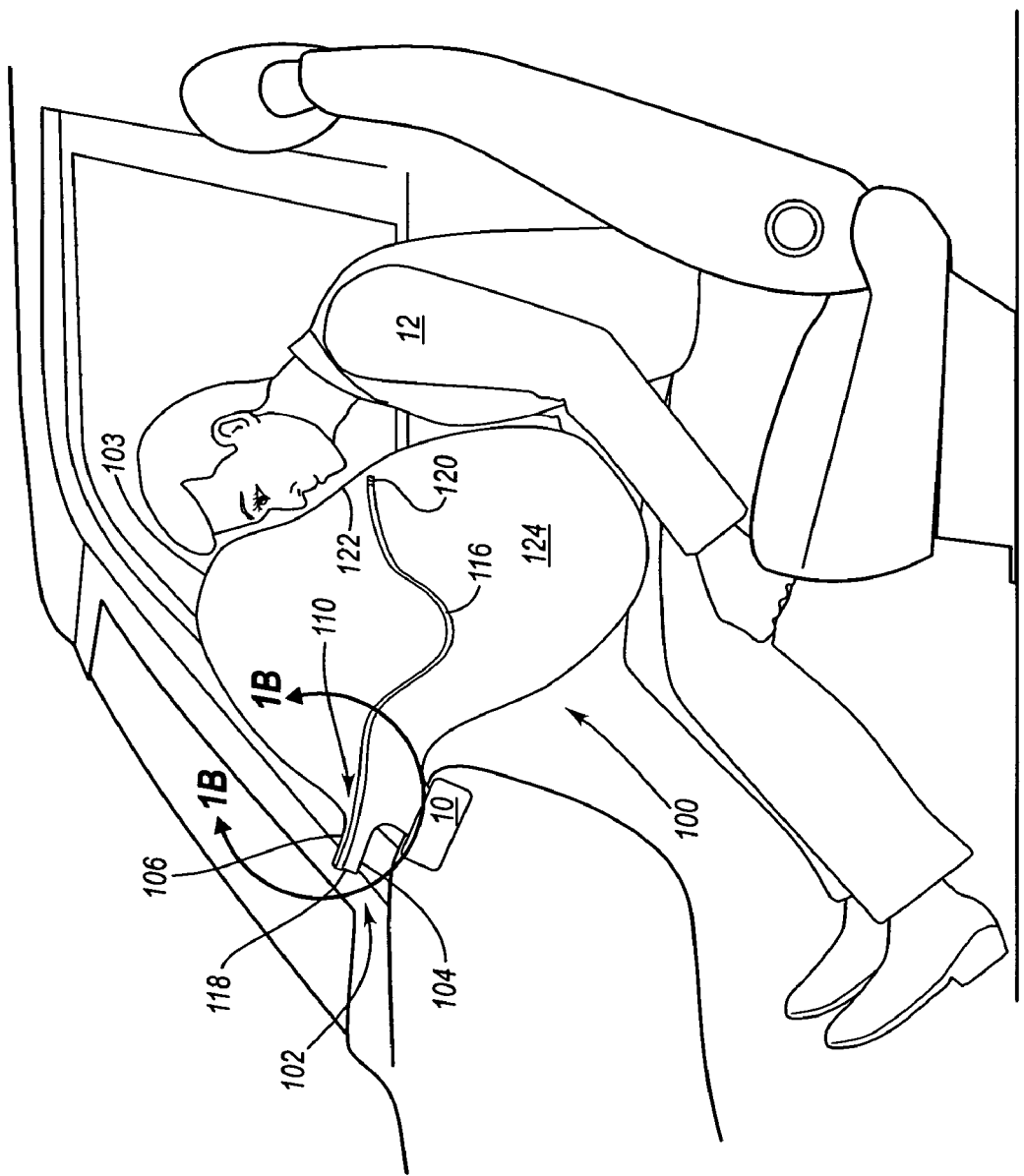
Fig. 1B
Fig. 1A

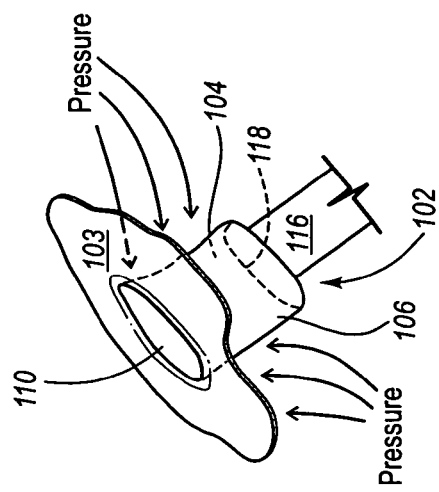
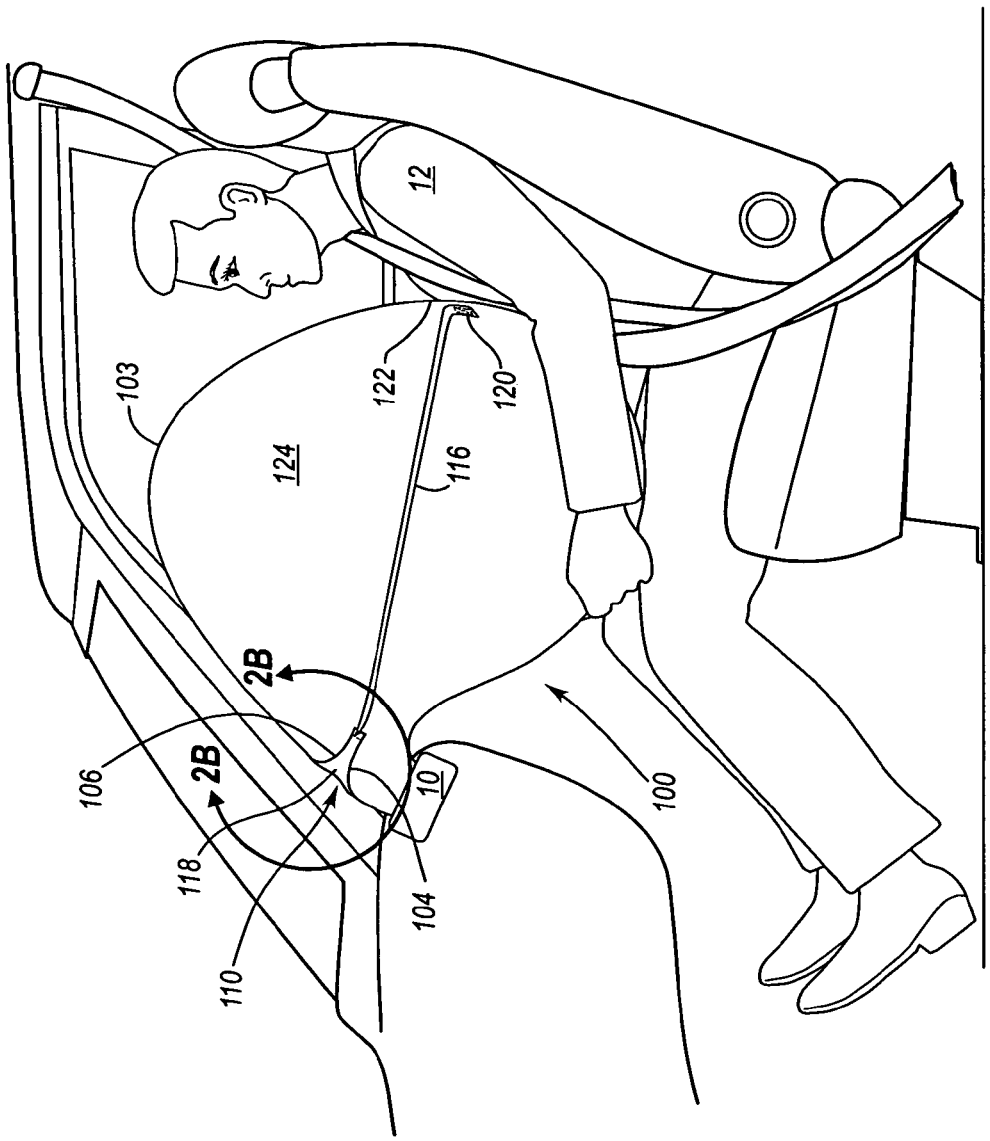
Fig. 2B
Fig. 2A

AIRBAG CUSHION WITH TETHER DEACTIVATED VENTING FOR REDUCED OUT-OF-POSITION EFFECTS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1A is a side view of one embodiment of a deploying airbag.

FIG. 1B is a cross-sectional view of the airbag of FIG. 1A taken along A-A.

FIG. 2A is a side view of one embodiment of a deploying airbag.

FIG. 2B is a cross-sectional view of the airbag of FIG. 2A taken along B-B.

DETAILED DESCRIPTION OF PREFERRED EMBODIMENTS

Figure 3:
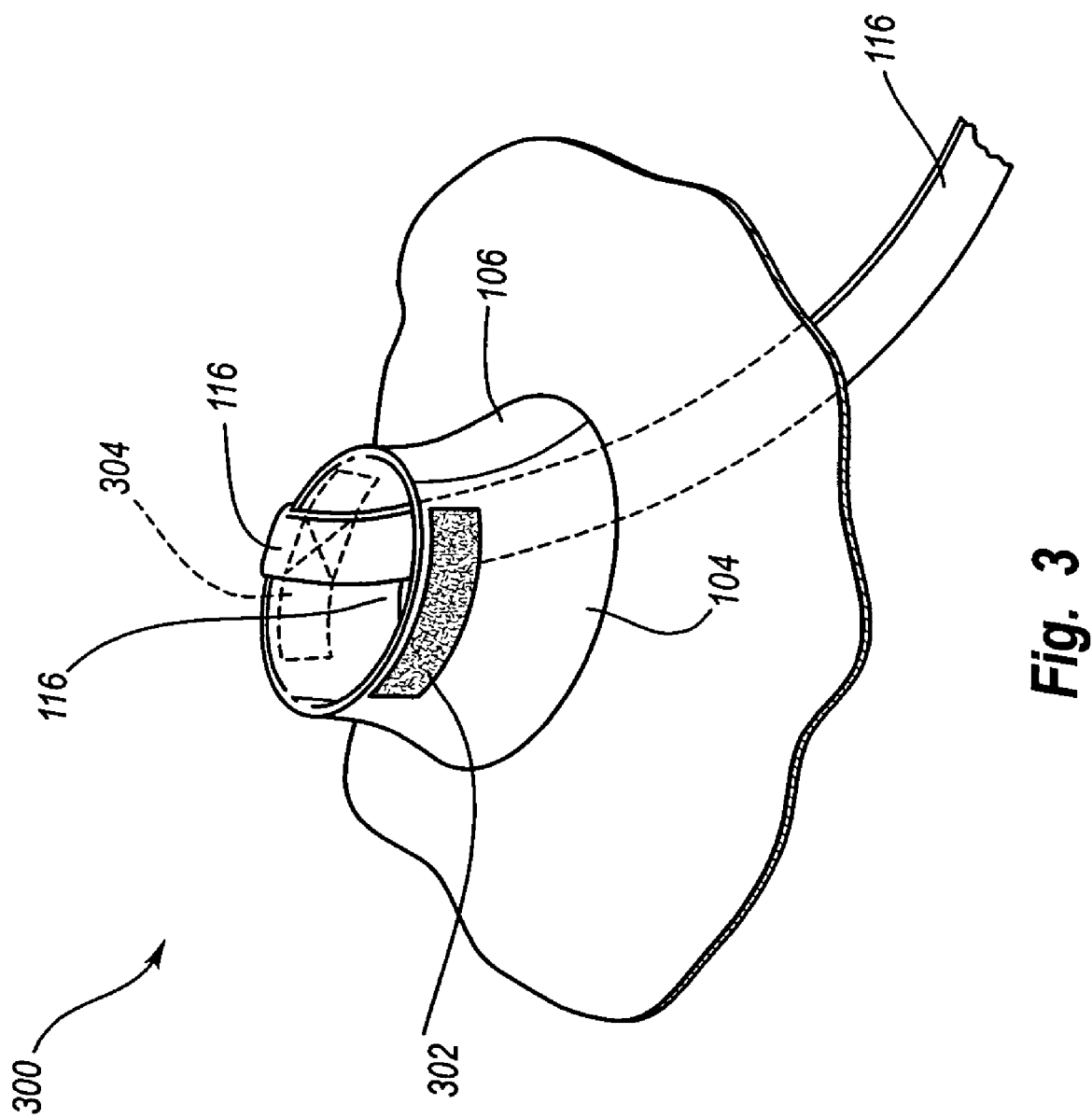
FIG. 3 is a perspective view of an embodiment of a vent.

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, the airbag cushion inflates and deploys through a cosmetic cover. The airbag cushion deploys towards the occupant and provides a restraint. A potentially dangerous situation occurs when an occupant is positioned too closely to the airbag which causes the occupant to contact the airbag as it is deploying. Ideally, the occupant should be in position to impact the airbag only after full deployment. It would be advantageous to provide an airbag with a softer deployment when an occupant is out-of-position. Embodiments described below provide an airbag cushion that responds to an occupant's position and vents accordingly to reduce the severity of a deploying contact.

With reference now to the accompanying figures, particular embodiments of the invention will now be described in greater detail. FIG. 1A depicts a cross sectional view of an airbag cushion 100 deploying from a housing 10. The airbag cushion 100 is shown colliding with an occupant 12 who is impeding the path of the deploying airbag cushion 100. The airbag cushion 100 includes a vent 102 that is disposed on the exterior surface 103 of the cushion 100. The vent 102 may be embodied with two flaps 104, 106 that are coupled to one another along their edges to form a trunk-like shape, envelope, or reed valve through which gas may pass. The flaps 104, 106 are coupled to the exterior surface 103 of the airbag cushion 100 so as to circumvent an aperture 110. Coupling of the airbag flaps 104, 106 may be through stitches, bonding, adhesives, and the like. Alternatively, the vent 102 may include a single flap that circumvents the aperture and is coupled to itself to form an envelope through which gas may pass.

Referring to FIG. 1B, and with continued reference to FIG. 1A, a cross-sectional view of FIG. 1A taken along 1B-1B is shown. FIG. 1B illustrates a first flap 104 that is coupled to the second flap 106 along edges 112, 114. The airbag cushion 100 includes a tether 116 that is coupled at a proximate end 118 to either the first or second flap 104, 106. The tether 116 may be integrally formed with a flap 104, 106 or may be coupled to a flap 104, 106 through stitches, bonds, adhesives and the like. A distal end 120 of the tether 116 is coupled to a distal interior surface 122 of the airbag cushion 100.

The tether 116 is attached at both ends 118, 120 and sized appropriately so that the tether 116 pulls tight during deployment if the airbag cushion 100 deploys unimpeded. However, the tether 116 remains slack if the deploying airbag cushion 100 is impeded by an occupant 12 in its path. FIGS. 1A and 1B depict an occupant 12 who is "out-of-position" and is impeding airbag cushion deployment. An out-of-position occupant 12 is one who is seated in a forward position so as to obstruct the path of cushion deployment. Before deployment of the airbag cushion 100, the vent 102 is disposed outside the cushion interior 124. During deployment, the tether 116 remains slack and the vent 102 remains outside of the cushion interior 124. The pressure within the cushion interior 124 pushes the flaps 104, 106 apart, allowing gas to freely vent. In this manner, the airbag cushion 100 builds up less pressure and avoids injuring an occupant impeding the deployment.

Referring to FIG. 2A and FIG. 2B, which is a cross-sectional view taken along 2B-2B, an unobstructed deploying airbag cushion 100 is shown. The occupant 12 is positioned rearward of the deployment path. When the airbag cushion 100 deploys without being impeded, the tether 116 becomes taut and thereafter pulls the vent 102 to a position within the cushion interior 124. With the vent 102 in the interior 124, the interior pressure acts to push the flaps 104, 106 together. This effectively closes the vent 102 and prevents gas from venting. This allows the airbag cushion 100 to achieve its full pressure that will adequately protect a properly positioned occupant 12.

Although a single vent 102 and aperture 110 are illustrated in embodiments herein, an airbag cushion 100 may be embodied with multiple vents 102 and apertures 110 to increase venting capability. The size of the vent 102 and aperture 110 may also be modified to provide the desired venting.

Referring to FIG. 3 a perspective view of an alternative embodiment of a vent 300 is shown. Hook and loop fastener materials, such as Velcro materials, identified at 302, 304, are disposed on flaps 104, 106 such that when the vent 102 is outside of the interior 124, hook and loop fastener materials 302, 304 do not engage one another. When the vent 300 is pulled within the interior 124, the hook and loop fastener materials 302, 304 engage each other as the flaps 104, 106 come together. The engaged hook and loop fastener materials 302, 304 effectively secure the flaps 104, 106 together. The hook and loop fastener materials 302, 304 and the interior pressure act together to ensure that the flaps 104, 106 remain secured to prevent venting even during ride down when the tether may slacken.

Figure 4:
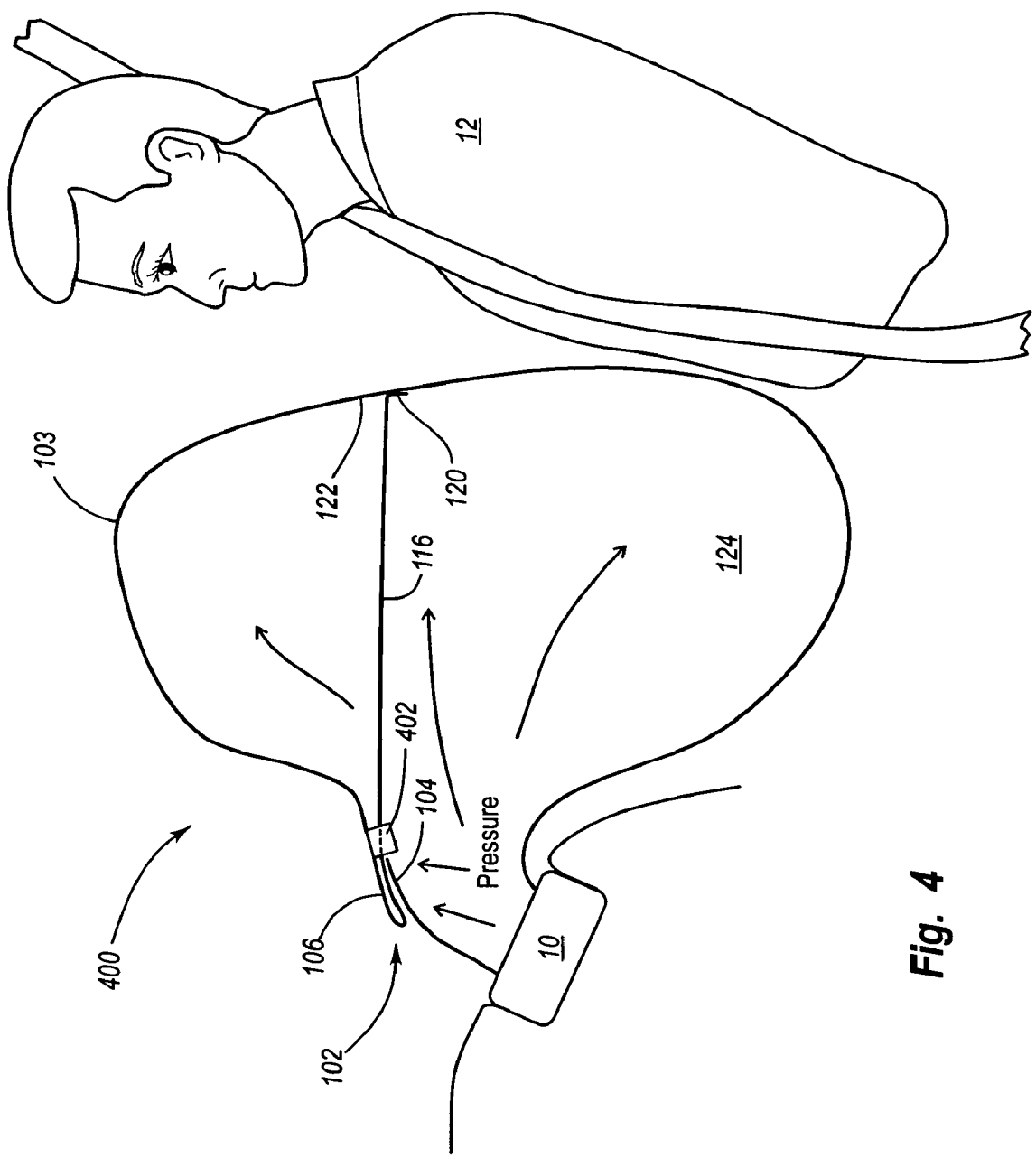
FIG. 4 is a cross-sectional view of an alternative embodiment of a deploying airbag.

Referring to FIG. 4, a cross-sectional view of an alternative embodiment of an airbag cushion 400 is shown. The airbag cushion 400 is depicted as being fully deployed and the occupant 12 is in a non-obstructive position. The airbag cushion 400 is shown with an unrestrained deployment and with a taut tether 116. The airbag cushion 400 is similar to that of airbag cushion 100 but also includes an interior loop 402. The loop 402 may include a fabric-like material that is folded over and coupled to itself. The loop 402 is open on opposing ends with the tether 116 passing through. The loop 402 is coupled to an interior surface 404 of the airbag cushion 400 by stitches, bonds, adhesives and the like. The loop 402 controls the tether movement and provides a frictional restriction to prevent the vent 102 from exiting out of the cushion interior 124 even if the tether 116 subsequently becomes slack again. The amount of restriction provided by the loop 402 may vary depending on the longitudinal length and material of the loop 402.

Figures 5A, 5B:
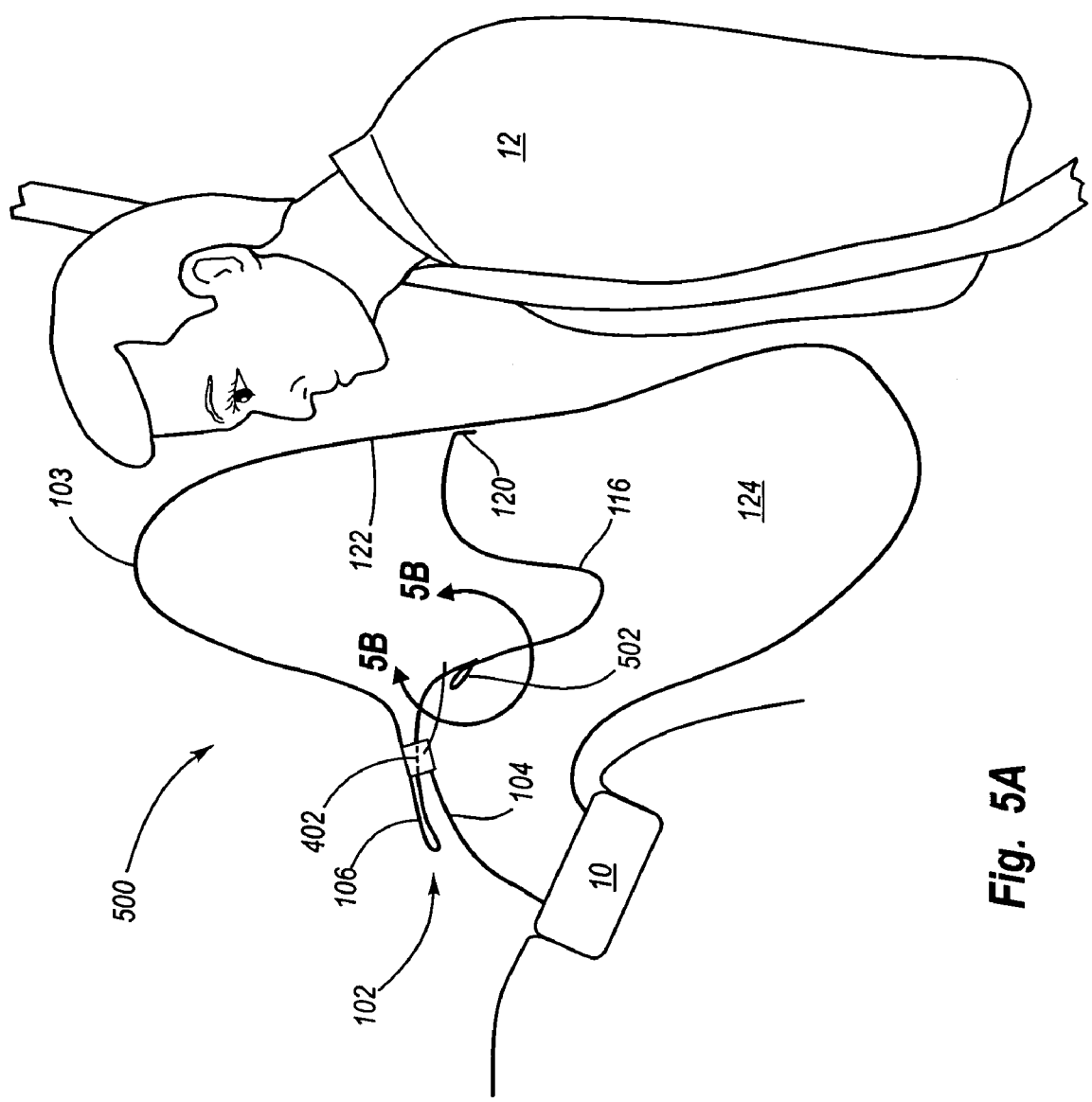
FIG. 5A is a cross-sectional view of an alternative embodiment of a deploying airbag.
FIG. 5B is an enlarged perspective view of the alternative embodiment of a deploying airbag shown in FIG. 5A.

Referring to FIG. 5A, a cross-sectional view of an alternative embodiment of an airbag cushion 500 is shown. The airbag cushion 500 is shown deflating after full deployment which causes the tether 116 to become slack. Deflation may occur by gas leaking through seams or venting apertures (not shown) disposed within the airbag cushion 500. The airbag cushion 500 is similar to that of FIG. 4, but also includes a tether flap 502 coupled to the tether 116. The tether flap 502 may be formed by folding over a portion of the tether 116 and securing the extending portion. Alternatively, the tether flap 502 may be formed by securing a material to the tether 116. The tether flap 502 is configured to easily pass through the loop 402 in one direction, such as during deployment, but to catch on the loop 402 and prevent tether movement in the reverse direction. The tether flap 502 and loop 402 operate together to restrict movement of the tether 116 during deflation. The vent 102, once entering the cushion interior 124, is retained within the interior 124 during deflation and the flaps 104 remain secured together. FIG. 5B is a better view of tether flap 502.

Figure 6:
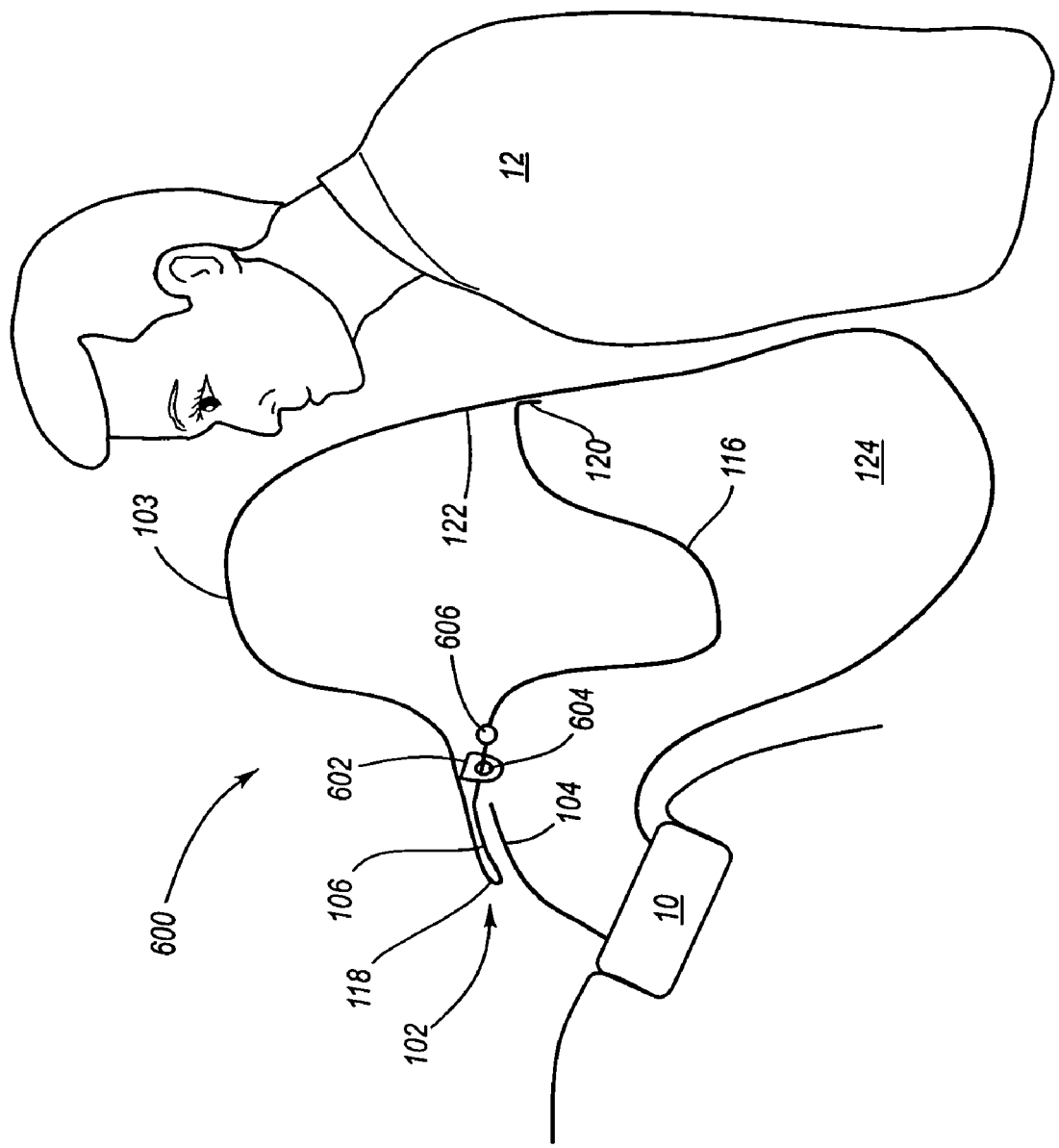
FIG. 6 is a cross-sectional view of an alternative embodiment of a deploying airbag.

Referring to FIG. 6 a cross-sectional view of an alternative embodiment of an airbag cushion 600 is shown. The airbag cushion 600 is partially deflated after full deployment which causes the tether 116 to become slack. The airbag cushion 600 is similar to that of FIGS. 1 and 2 but also includes a ring member 602 that is secured to the airbag cushion 600 within the interior 124. The ring member 602 may be formed of a rigid material and defines a ring aperture 604 through which the tether 116 passes. The tether 116 includes a stop 606 that may be embodied in a variety of suitable shapes known in the art.

During airbag cushion deployment, the stop 606 passes from a position proximate to the vent 102 and through the ring aperture 604. The stop 606 is configured to prevent passage through the ring aperture 604 for non-deploying forces. The stop 606 may be larger than the ring aperture 604 and the ring member 602 and/or stop 606 may include elastic materials to allow deformation under force. With less than deploying force, the stop 606 is unable to pass through the ring aperture 604. Thus, during airbag cushion 600 deflation, the tether 116, stop 606, and ring member 602 retain the vent 102 within the airbag cushion interior 124.

Embodiments disclosed herein illustrate novel techniques for venting an airbag cushion to retain an open vent when an occupant obstructs the path of a deploying cushion and a closed vent when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

The above description fully discloses the invention including preferred embodiments thereof. Without further elaboration, it is believed that one skilled in the art can use the preceding description to utilize the invention to its fullest extent.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag cushion, comprising:
   an inflatable airbag having a vent; and
   a tether coupled to the vent and to an interior surface of the airbag such that upon inflatable airbag deployment with obstruction, the tether does not fully extend and the vent remains outside of the inflatable airbag interior; and
      wherein the tether is configured to fully extend and to pull the vent into the inflatable airbag interior thereby closing the vent upon inflatable airbag deployment without obstruction; and
      wherein the vent has opposing hook and loop fastener materials configured to be secured to one another upon inflatable airbag deployment without obstruction.

2. The airbag cushion of claim 1, wherein the vent comprises first and second flaps secured to one another to allow gas venting.

3. The airbag cushion of claim 2, wherein the tether comprises,
   a first end coupled to the first flap; and
   a second end coupled to the interior surface of the airbag.

4. An airbag cushion, comprising:
   an inflatable airbag having a vent;
   a tether coupled to the vent and to an interior surface of the airbag such that upon inflatable airbag deployment with obstruction, the tether does not fully extend and the vent remains outside the inflatable airbag interior,
      wherein the tether is configured to fully extend and to pull the vent into the inflatable airbag interior thereby closing the vent upon inflatable airbag deployment without obstruction; and
   a loop disposed within the inflatable airbag, wherein the loop is configured to permit passage of the tether during airbag deployment and to restrict movement of the tether during airbag deflation.

5. The airbag cushion of claim 4, further comprising a tether flap coupled to the tether, wherein the tether flap is configured to pass through the loop during airbag deployment and to restrict movement through the loop during airbag deflation.

6. The airbag cushion of claim 4, wherein the vent includes first and second flaps secured to one another to allow gas venting.

7. The airbag cushion of claim 6, wherein the tether comprises,
   a first end coupled to the first flap; and
   a second end coupled to the interior surface of the airbag. An airbag cushion is disclosed for use in automotive protective systems. The airbag cushion includes a vent that, prior to cushion deployment, extends from the cushion exterior. A tether is coupled to the vent and to an interior surface of the cushion. Upon airbag deployment, the tether extends until taut or extends until the cushion encounters an obstruction. If pulled taut, the tether pulls the vent into the cushion interior where the interior air pressure effectively closes the vent. If the cushion encounters an obstruction, the tether remains lax, and the vent remains on the cushion exterior. Structures are provided for retaining the vent in the closed position during occupant ride down.

8. An airbag cushion, comprising:
   an inflatable airbag having a vent;
   a tether couple to the vent and to an interior surface of the airbag such that upon inflatable airbag deployment with obstruction, the tether does not fully extend and the vent remains outside of the inflatable airbag interior;
      wherein the tether is configured to fully extend and to pull the vent into the inflatable airbag interior thereby closing the vent upon inflatable airbag deployment without obstruction; and
   a ring member disposed within the inflatable airbag interior and having a ring aperture configure to permit passage of the tether; and
      wherein the tether includes a stop which passes through the ring aperture during airbag deployment and restricts movement through the ring aperture during airbag deflation.

9. The airbag cushion of claim 8, wherein the vent includes first and second flaps secured to one another to allow gas venting.

10. The airbag cushion of claim 9, wherein the tether comprises,
   a first end coupled to the first flap; and
   a second end coupled to the interior surface of the airbag.

11. An airbag cushion, comprising:
   an inflatable airbag;
   means for venting gas out of the airbag; and
   means for tethering the venting means to an interior surface of the airbag, wherein the tethering means and the venting means are configured such that upon inflatable airbag deployment with obstruction, the tethering means does not fully extend and the venting means remains outside the inflatable airbag interior and the venting means remains open, and
      wherein the tethering means and the venting means are configured such that upon inflatable airbag deployment without obstruction, the tethering means fully extends and pulls the venting means into the inflatable airbag interior and closes the venting means, and
      wherein the venting means has opposing hook and loop fastener materials configured to be secured to one another upon inflatable airbag deployment without obstruction.

12. An airbag cushion comprising:
   an inflatable airbag;
   means for venting gas out of the airbag; and
   means for tethering the venting means to an interior surface of the airbag, wherein the tethering means and the venting means are configured such that upon inflatable airbag deployment with obstruction, the tethering means does not fully extend and the venting means remains outside the inflatable airbag interior and the venting means remains open, and
      wherein the tethering means and the venting means are configured such that upon inflatable airbag deployment without obstruction, the tethering means fully extends and pulls the venting means into the inflatable airbag interior and closes the venting means, and
   means for permitting passage of the tethering means during airbag inflation and for restricting the tethering means from passing during airbag deflation.

* * * * *